July 14, 1970     W. H. GLENN ET AL     3,520,616

OPTICAL PULSE MEASUREMENT SYSTEM

Filed Jan. 4, 1968     3 Sheets-Sheet 1

INVENTORS
MICHAEL J. BRIENZA
WILLIAM H. GLENN

BY Donald F. Bradley
ATTORNEY

TIME  FIG. 4
DETECTOR OUTPUT
A  
B 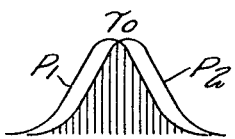 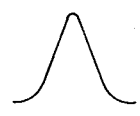
C  
D  
E 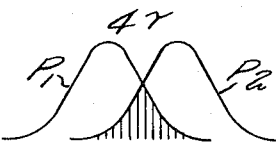 
F  
G 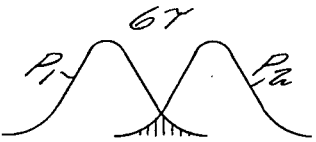 
H 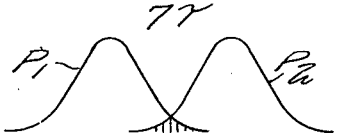 
I  

United States Patent Office 3,520,616
Patented July 14, 1970

3,520,616
OPTICAL PULSE MEASUREMENT SYSTEM
William H. Glenn and Michael J. Brienza, Vernon, Conn., assignors to United Aircraft Corporation, East Hartford, Conn., a corporation of Delaware
Filed Jan. 4, 1968, Ser. No. 695,743
Int. Cl. H01s 3/10; G01f 15/34; G01n 21/40
U.S. Cl. 356—114                                 26 Claims

ABSTRACT OF THE DISCLOSURE

An optical pulse to be measured and a reference pulse coincident in time with the original pulse are continuously recirculated in an optical resonator. A birefringent crystal in the resonator delays one pulse a fixed amount relative to the other during each circulation. An optical multiplier crystal inserted in the cavity responds to the coincidence between the circulating pulses in the crystal and produces for each circulation a second harmonic signal which is then reflected out of the resonator, square-law detected and integrated to produce a series of output pulses proportional to the correlation of the intensity of the original pulse.

BACKGROUND OF THE INVENTION

Field of invention

This invention relates to the measurement of ultrashort laser pulses and particularly to a system for measuring the duration and shape of a single laser pulse or a train of pulses.

Another aspect of this invention is a system for resolving laser pulses which occur closely in time.

Description of the prior art

The present state of laser technology is capable if generating optical pulses as short as $10^{-13}$ seconds in width, and generating a repetitive train of pulses in which the pulses are separated by times as short as $10^{-9}$ seconds. Detection of such short pulses, and resolution of such pulses, spaced as close as $10^{-12}$ seconds, has been difficult due to the inherently slow time response of available detectors.

Present techniques for the measurement of sub-nanosecond light pulses fall into two classes, vacuum photodiodes and streak cameras. State-of-the-art photodiodes have response times in the range of $10^{-10}$ seconds. The time resolutions of streak cameras depends on a number of factors including beam size, streak speed and film resolution, but generally is in the order of $10^{-9}$ seconds. Streak cameras have further disadvantages since the output is a film record, and photographic equipment is very expensive.

The basic pulse measurement technique of this invention has been described by the inventors in an article entitled "Time Evolution of Picosecond Optical Pulses," Applied Physics Letter, vol. 10, p. 21, Apr. 15, 1967. As described in the article, the pulse to be measured is resolved into two components of equal amplitude and orthogonal polarization. One of the components is then delayed in time wiht respect to the other by a known amount. The two components are then caused to interact in a non-linear optical crystal to produce second harmonic radiation, the orientation of the crystal being such that the second harmonic is produced only when both components are present in the crystal. The optical crystal multiplies the amplitudes of two component signals; the amplitude of the second harmonic radiation is proportional to the product of the amplitude of the delayed pulse component and the amplitude of the undelayed pulse component. The intensity of the second harmonic radiation is the square of the amplitude and is thus proportional to the product of the intensities of the delayed and undelayed pulse components. The energy of the second harmonic pulse is the time integral of the intensity and is proportional to the autocorrelation function of the original pulse intensity, evaluated at a time shift given by the delay time.

The second harmonic radiation is detected by a high speed photodiode. This diode has a square-law amplitude response and a time response that is long compared to the duration of the second harmonic pulse. This diode performs the requisite squaring and integration of the signal and produces an output pulse whose amplitude or area is proportional to the intensity autocorrelation function of the original pulse.

In addition, one component of the pulse is used to measure the intensity autocorrelation for zero delay. This signal is used as a reference for normalization.

If the correlation function is initially determined with no delay between the two components, and additional laser pulses are generated and the process repeated with increasing delays between the two components, the shape and width of a typical laser pulse may be determined. Alternatively a train of pulses may be used with a fixed delay to determine the change in correlation function, i.e. pulse shape, which occurs as the pulse train progresses.

It should be understood that when measurement of laser pulse shape is referred to in this specification, it is to be interpreted in a restricted sense. The apparatus and method disclosed herein measures the autocorrelation of the pulse intensity. This measurement gives information about the shape of the pulse, but does not necessarily specify the shape uniquely. This is a result of the fact that pulses having different shapes can produce the same intensity autocorrelation. For example, an asymmetric pulse and its time-reversed counterpart give the same autocorrelation function.

The described system has produced measurements of considerable interest, and has shown, for example, that in a train of mode-locked laser pulses the first pulses of the train are very short and increase in width as the train develops. It has also been determined that variations occur in consecutive single laser pulses produced by the same laser. The system above described is limited to producing a measurement of a single delay time for each laser firing, and since laser pulses may vary in length or shape from one to the other, additional data is necessary to characterize the pulses so that similar pulses in successive firings of the laser may be compared.

SUMMARY OF INVENTION

This limitation has been overcome by the system described herein. The laser pulse of interest is injected into an optical resonator of mirrors or prisms wherein the laser pulse is recirculated continuously around a closed path. Positioned within the resonator in the path of the circulating laser pulse is a non-linear optical crystal multiplier such as KDP, and an optical delay generator such as calcite. Also inserted in the path of the laser beam is a coated glass material appropriately coated to reflect out of the closed path second harmonic radiation.

In order to produce the desired second harmonic output signal, a reference pulse must be inserted into the optical resonator. The reference pulse may be an independent pulse, or it may be identical with the original pulse. In either case the reference pulse must be orthogonally polarized relative to the original pulse. A polarizer may be required to provide the required polarization.

Since laser pulses are generally linearly polarized, one way of producing the reference pulse is to separate the laser pulse into its orthogonal components, using one polarization component as the original pulse and the other polarization component as the reference pulse. When both polarization components coincide in the KDP crystal, a second harmonic signal is produced proportional to the product of the amplitudes of the two components. The second harmonic signal being of only one polarization then passes through the calcite unchanged, and is reflected out of the resonator onto a photodetector by the coated glass material.

The two polarized pulse components also pass through the calcite where one of the components is delayed relative to the other. These pulse components both pass through the coated glass unchanged and again pass through the KDP where another second harmonic signal is produced proportional to the product of the amplitudes of the time shifted components. This new second harmonic signal is again detected, and the process continues, each successive pass further time-separating the two pulse components until they are time shifted to an extent where they do not overlap, at which time no further second harmonic signal is produced.

By choosing the thickness of the calcite properly, the delay between the two pulse components may be regulated to produce any desired number of second harmonic signals, and the sampling increments may thus be varied.

The photodetector which responds to the second harmonic outputs is square-law, and its relatively slow response effectively averages or integrates the squared second harmonic signal, thereby producing an output signal proportional to the energy of the second harmonic, which itself is proportional to the value of the intensity autocorrelation of the original pulse at a given value of delay. Thus by plotting successive detector outputs, the shape and duration of the original pulse may be determined.

The operation of the system is similar to a sampling oscilloscope in that the signal is sampled over very small increments of time, and the output is displayed on an expanded time scale where relatively slow, high-gain photomultipliers can be used. This system does not need the repetitive type signals necessary for ordinary sampling oscilloscopes.

An object of this invention is therefore to produce a pulse measuring system for very short optical pulses.

Another object of this invention is a pulse detector for measuring the time duration of single optical pulses.

A further object of this invention is a pulse detector for investigating the shape of an optical pulse.

Another object of this invention is a system for measuring a very short optical pulse in which the pulse is sampled at increments which may be adjusted.

A further object of this invention is an optical pulse measuring system in which the pulse is split into two portions of full intensity, the two portions being recirculated in an optical resonator with variable time delays therebetween.

These and other objects of this invention may be more fully understood by referring to the following description and drawings.

BRIEF DESCRIPTION OF THE DRAWING

FIG. 1 shows in functional form the operation of the system of this invention.

FIG. 2 shows in schematic block-diagram form the entire system of FIG. 1.

FIG. 4 shows graphically the pulses produced at different times by the system of FIG. 2.

FIG. 5 shows the pulse autocorrelation reconstructed from the pulses of FIG. 4.

DESCRIPTION OF THE PREFERRED EMBODIMENT

Figure 3:
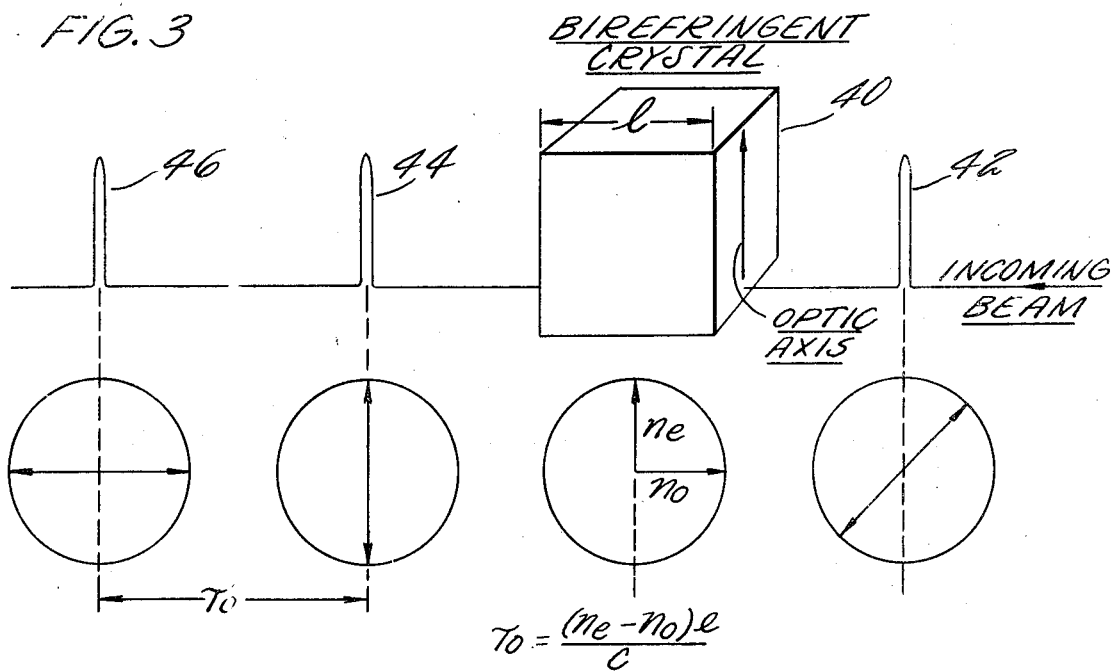
FIG. 3 shows schematically the operation of the delay generator of FIG. 2.

Referring to FIG. 1 there is illustrated an ultrashort optical pulse 10 such as one generated by a simultaneously Q-switched and mode-locked glass or ruby laser by means of a saturable absorber within the laser cavity. Such pulses are known to have a time duration as short as $10^{-13}$ seconds, and successive pulses in a train are separated in time by as little as $10^{-9}$ seconds.

The initial laser pulse may be arbitrarily polarized, or unpolarized, and may be either a simple single pulse or a complicated pulse shape.

Before it is possible to detect this signal as envisioned by this invention, it is necessary to polarize the initial pulse if it is not already polarized and to generate an orthogonally polarized reference pulse component. The simplest way to accomplish this is to pass the initial optical pulse through a polarizer 12 in which the initial pulse is polarized at 45° with respect to the optic axis of the delay generator, and thus contains two polarization components of one signal 90° apart.

The two polarization components may also be two independent signals, for example a complicated optical pulse which is horizontally polarized, and a reference pulse which is vertically polarized.

For simplicity it will be assumed that the two polarization components are horizontal and vertical components from one initial signal and therefore contain the same carrier frequency, but this frequency identity is not necessary as would be the case for the correlation of two independent signals.

Once the two polarization components are obtained, both signals are passed through a delay generator 16 such as a birefringent crystal of calcite to be described in detail subsequently. The two components pass through the calcite crystal where one polarization component 15 is delayed in time with respect to the other component 13 by a known amount determined by the thickness and orientation of the crystal. The two components 13 and 15 are shown as $E_1(t)$ and $E_1(t-\tau o)$ where $\tau o$ is the delay time.

The two components are then caused to interact in a non-linear optical multiplier crystal 18 such as KDP $$(KH_2PO_4)$$

or ADP $(NH_4H_2PO_4)$ to produce second harmonic radiation. As will be described, if the non-linear crystal is properly oriented, no second harmonic is produced by either polarization component acting alone, but only when both are present together. The second harmonic signal $E_s$ has an amplitude which is the product of the amplitudes of the two components, i.e., $E_s=E_1(t)E_1(t-\tau)$. The generation of the second harmonic signal 22 only when both components are present in the crystal thus measures the "overlap" of the original optical pulse with a delayed replica of the pulse as shown by reference numeral 20, and the amplitude of the second harmonic signal 22 is proportional to the product of the amplitudes of the components.

The two component signals 13 and 15 together with the second harmonic signal 22 then pass through a glass filter 24 which is coated so that the component signals 13 and 15 pass therethrough, but the second harmonic signal 22 is reflected by the coating toward a square-law detector 26 whose response time is longer than the duration of the second harmonic signal. Such coatings are well known in the art. The detector effectively squares the signal, and its long response time integrates or averages the signal over its time duration. The detector output is thus $E_s = \int [E_1(t)E_1(t-\tau o)]^2 dt$, which is the energy contained in the second harmonic signal and a direct measure of the overlap of the components 13 and 15.

For this system to reconstruct a history of the original laser optical pulse it is necessary either to store the original pulse and again pass it through the system of FIG. 1 with the delay generator 16 varied to give a longer delay between the two polarization components, or to recirculate the two time-shifted components 13 and 15 back through the same system to produce a further time delay between components. It is not feasible in most circumstances to generate another identical laser pulse, since even laser pulses generated by the same apparatus under identical conditions will vary somewhat. Of the two alternatives, storing and recirculation is the more practical one rather than repetitious firing of the laser.

FIG. 2 shows the preferred apparatus to practice this invention. The basic operation is similar to FIG. 1.

Initially, the input pulse 10′ generated by the laser is passed through polarizer 12′ where it is polarized at 45° as in FIG. 1, the polarized pulse thereby containing a horizontal polarized component and a vertical polarized component 90° apart. It should be noted that the polarizer is not necessary when the input pulse is already polarized since the two components are already available.

The polarized pulse 14′ is then fed into a recirculating optical resonator consisting of two prisms, 30 and 32. Prism 32 is triangular, while prism 30 is trapezoidal to provide an exit for the optical pulse. The top face 34 of prism 32 is cut or shortened relative to prism 30 to provide a path for the polarized laser pulse 14 to be inserted into the resonator parallel to the resonator axis without striking prism 32. Other types of optical resonators such as mirrors, and other methods for inserting the pulses into the resonator will be apparent to those skilled in the art.

Inserted as shown in the resonator cavity is a glass filter medium 24′ coated with an appropriate material whereby the polarized optical pulses will pass therethrough with little or no attenuation, but second harmonic radiation will be reflected. Also inserted in the resonator cavity is a non-linear optical multiplier crystal of KDP, 18′, and a birefringent calcite crystal delay generator 16′.

The input pulse 14 consisting of horizontal and vertical polarization components is fed into the resonator via the refractive effect produced by its passing through glass medium 24′. The pulse passes through glass filter 24′ unchanged except as to its direction, and is reflected internally in prism 30 and directed to KDP crystal 18′ where optical multiplication and generation of a second harmonic signal takes place. FIG. 4 shows this first pass at time A. Both polarization components $P_1$ and $P_2$ pass through KDP crystal 18′ simultaneously since no delay has occurred yet, and a second harmonic signal is also generated as shown in FIG. 4.

Both unshifted components and the second harmonic pass through calcite crystal 16′, the second harmonic and component $P_1$ passing through unaffected, whereas component $P_2$ is delayed by a time $\tau o$. The now time-separated components $P_1$ and $P_2$ and the second harmonic are internally reflected in prism 32 by the path as shown and pass through glass filter 24′ where the second harmonic is reflected out of the resonator and through lens 36 to detector 26′ which produces an output signal as described previously and is shown in FIG. 4 at time A.

Components $P_1$ and $P_2$ circulate again through the resonator where another second harmonic is produced in KDP crystal 18′. On this pass, shown at time B of FIG. 4, components $P_1$ and $P_2$, being now time separated by $\tau o$, generate a slightly lower amplitude second harmonic. Again the two components $P_1$ and $P_2$ pass through the calcite crystal 16′ where $P_2$ is further delayed by time $\tau o$ so that $P_2$ lags $P_1$ by 2 $\tau o$. Second harmonic B is again reflected out of the resonator by glass filter 24′ and produces a detector output B.

The two components again reflect through the resonator producing a second harmonic at time C, $P_2$ is again delayed so as to lag $P_1$ by 3 $\tau o$, and this process is repeated until $P_2$ and $P_1$ no longer overlap and no second harmonic is generated. The two components may continue to circulate in the resonator until they exit from face 38 of prism 30.

FIG. 5 shows how the intensity autocorrelation of the original laser pulse may be reconstructed from the output of detector 26′. The detector output has an amplitude proportional to the integral of the square of the multiplied components. The detector output amplitude may be plotted as a function of the delay times $\tau o$, 2 $\tau o$, etc. which component $P_2$ makes with $P_1$, and in FIG. 5 the reference characters A, B, . . . I show the detector output pulses A through I plotted as a function of the delay time.

FIG. 3 shows the operation of the birefringent calcite crystal delay generator 16. The crystal 40 in FIG. 3 is oriented with the optic axis in the plane of the crystal front face and perpendicular to the top face. With this arrangement a vertically polarized signal will propagate as an extraordinary ray with a group velocity $$ve = \frac{c}{\eta'_e}$$

and a horizontally polarized signal will travel as an ordinary ray with a group velocity $$vo = \frac{c}{\eta'_o}$$

Here $c$ is the velocity of light and $\eta_o'$ and $\eta_e'$ are related to the principal indices of refraction of the crystal, $\eta_o$ and $\eta_e$, by the relation $$\eta'_{o,e} = \eta_{o,e} - \lambda \frac{\partial \eta_{o,e}}{\partial \lambda}$$

The difference in transit times $\Delta t$ is the thickness of the crystal $l$ divided by the velocity, or $$\frac{l}{ve} - \frac{l}{vo}$$

Substituting, $$\Delta t = \frac{(\eta'_e - \eta'_o)l}{c} = \tau_o$$

For calcite this delay is approximately $0.5 \times 10^{-12}$ sec. per mm. of crystal at a wavelength of 1.06 microns (10,600 A.).

In FIG. 3 a pulse 42 which is shown as linearly polarized is fed into the birefringent crystal 40 as described. The crystal 40 will resolve the original pulse into its two components, pulse 44 being vertically polarized, and pulse 46 being horizontally polarized, the two pulses being separated in time by $\tau o$.

The optical multiplier 18 is preferably a non-linear optical crystal having the tetragonal symmetry characteristics of such materials as $KH_2PO_4$ (KDP) and $NH_4H_2PO_4$ (ADP). While KDP and ADP are preferred, any crystal of the class in which ordinary-extraordinary interaction produces second harmonics may be used, such as GaAs. If the crystal is oriented with its optic axis at a specific angle, 61° 12′ for ADP, with respect to the direction of incidence, phase matching is produced between an ordinary ray and an extraordinary ray simultaneously propagated in the crystal, and second harmonic radiation is produced with horizontal polarization, in the above example at 5300 A. Other orientations of the multiplier crystal are possible, for example one in which a single horizontally polarized beam will alone produce second harmonic radiation. The amplitude of the second harmonic radiation will be proportional to the product of the amplitudes of the two incident rays. For additional information on this phenomenon, reference may be made to "Nonlinear Optics" by N. Bloenbergen, W. Benjamin, Inc., N.Y. (1965).

Detector 26 may be a standard photodiode such as United Aircraft Corporation Model 1240 which has a response time of about $3 \times 10^{-10}$ seconds.

Although not shown in the figures, it will be apparent to those skilled in the art that for the case where the initial pulse and the reference pulse are of different frequencies, the birefringent crystal might be eliminated since the dispersion which occurs, particularly in the KDP crystal and the prisms, will produce the desired time shift between the pulses.

An obvious advantage of this invention is that ultrashort laser pulses, since they now can be detected, may now be used for applications such as high resolution optical radar and optical data storage readout.

Another advantage of this invention is that the system may be used as an intensity auto-correlator or cross-correlator. The output is produced for $\tau = \eta \tau o, o < \eta > N$ where $\tau o$, the sampling interval, and N, the total number of pulses, may be selected at will by varying the thickness of the calcite crystal. The samples are produced in real time at a rate that can be chosen arbitrarily by varying the separation of the optical resonator prisms.

A further advantage of the invention is that the full intensity of the laser pulse may be used to produce the second harmonic and hence the output. Techniques which store the laser pulse and periodically tap out a small portion for measurement do not have this advantage.

Figure 6:
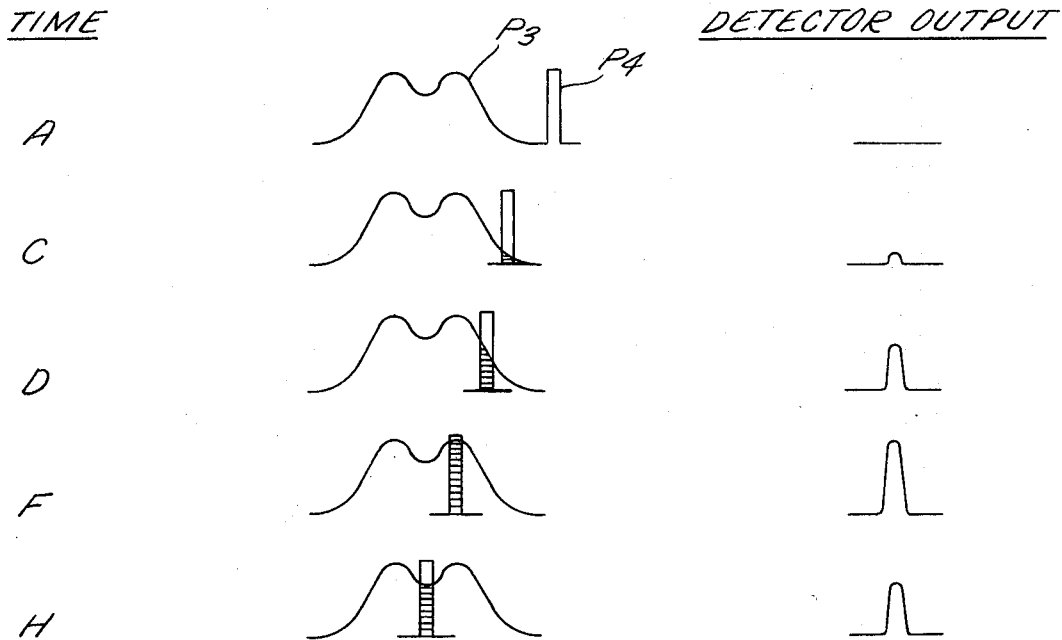
FIG. 6 shows graphically the pulses produced by the system of FIG. 2 where an independent reference pulse is used.

FIG. 6 is similar to FIG. 4 and shows the time history of the system operation and output pulses when two independent pulses are used as opposed to two identical pulses. For example, the initial laser or optical pulse may be a complex pulse $P_3$ containing a number of frequencies, and the reference pulse $P_4$ may be a narrow square pulse. Both pulses must be polarized. The operation is identical to the apparatus described previously.

The reference pulse $P_4$ at time A does not overlap pulse $P_3$, and no second harmonic is produced, and therefore the detector produces no output.

At time C, the reference pulse $P_4$ has been delayed and a small output is produced by the detector. At time D, with more overlap, a slightly higher detector output is produced.

At time F the amplitude of pulse $P_3$ at the point of overlap is close to a maximum, and a large detector output results. During a later circulation of the pulses, at time H, the amplitude of pulse $P_3$ has decreased, and consequently the detector output decreases.

Figure 7:
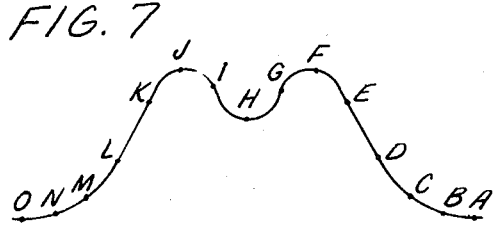
FIG. 7 shows the pulse autocorrelation reconstructed from the pulses of FIG. 6.

It is apparent that the shape of the initial pulse $P_3$ may be reproduced from the series of detector outputs as graphically shown in FIG. 7.

What is claimed is:
1. An optical pulse measurement system comprising:
a source of light pulses including a reference pulse and a first optical pulse to be measured,
an optical cavity,
means for injecting said first optical pulse into said cavity,
means for propagating said reference optical pulse in said cavity, said reference pulse being coincident in time with said first pulse,
means in said cavity for delaying said first pulse in time relative to said reference pulse,
non-linear optical means in said cavity responsive to the relative coincidence between said delayed first pulse and said reference pulse for producing an output signal proportional to the product of the amplitudes of said delayed first pulse and said reference pulse,
means for continuously recirculating said delayed first optical pulse and said reference pulse about said cavity to produce an additional time delay of said first pulse by said delaying means during each complete transit of said cavity,
an output signal proportional to the product of the amplitudes of said delayed first pulse and said reference pulse being produced by said non-linear optical means during each complete transit of said cavity,
detector means positioned to receive said output signals and produce therefrom a series of output pulses proportional to the intensity correlation function of said first pulse,
and indicator means utilizing the output pulses from said detector means.

2. An optical pulse measurement system as in claim 1 in which said first pulse and said reference pulse are orthogonally polarized relative to each other.

3. An optical pulse measurement system as in claim 1 in which said reference pulse is produced from said first pulse.

4. An optical pulse measurement system as in claim 1 in which said first pulse and said reference pulse are of different frequencies.

5. An optical pulse measurement system as in claim 4 in which said delaying means includes dispersion means in said optical cavity.

6. An optical pulse measurement system as in claim 1 in which said delaying means is a birefringent crystal positioned in said optical cavity in the path of said circulating pulses.

7. An optical pulse measurement system as in claim 6 in which said birefringent crystal is calcite.

8. An optical pulse measurement system as in claim 1 in which said non-linear optical means is an optical multiplier crystal positioned in said optical cavity in the path of said circulating pulses.

9. An optical pulse measurement system as in claim 8 in which said optical multiplier crystal is a material formed from the class of crystals in which ordinary-extraordinary optical beam interaction produces a second harmonic signal.

10. An optical pulse measurement system as in claim 1 and including reflector means positioned in said optical cavity in the path of said circulating pulses for transmitting said output signals out of said optical cavity.

11. An optical pulse measurement system as in claim 10 in which said reflecting means is a coated glass which is transparent to said circulating pulses and reflective to said output signals.

12. An optical pulse measurement system as in claim 1 in which said detector means is a photodiode having a square-law amplitude response and a time response long relative to the duration of said output signals.

13. An optical pulse measurement system as in claim 1 in which said output signals have a frequency which is the sum frequency of said first pulse frequency and said reference pulse frequency.

14. An optical pulse measurement system as in claim 1 in which said optical cavity is formed by a pair of facing prisms positioned to produce total internal reflectional of said pulses.

15. An optical pulse measurement system comprising:
a source light pulses including a reference pulse and a first optical pulse to be measured,
a plurality of spaced reflectors forming an optical cavity,
means for injecting said first optical pulse into said cavity,
means for propagating said reference optical pulse in said cavity, said reference pulse being coincident in time with said first pulse,
said first pulse and said reference pulse being continuously circulated in a closed path about said optical cavity,
a birefringent crystal positioned in said cavity in the path of said pulses, said pulses passing through said birefringent crystal, a time delay being produced in said first pulse relative to said reference pulse for each circulation of said pulses about said cavity,
a non-linear optical multiplier crystal also positioned in said cavity in the path of said pulses, said pulses passing through said multiplier crystal, an optical output signal proportional to the product of the amplitudes of said pulses being produced in said optical multiplier crystal for each circulation of said pulses about said cavity, said optical output signal also circulating through said cavity, means for transmitting said output signals out of said optical cavity, detector means positioned to receive said output signals and produce therefrom a series of output pulses proportional to the intenstiy correlation function of said first pulse, and indicator means utilizing the output pulses from said detector means.

16. An optical pulse measurement system as in claim 15 in which said means for transmitting said output signals out of said optical cavity is transmitting medium having a reflecting coating thereon positioned in said cavity in the path of said circulating pulses, said pulses passing therethrough and said output signal being reflected therefrom.

17. An optical pulse measurement system as in claim 16 in which said output signals have a frequency which is the sum frequency of the said first optical pulse and the said reference optical pulse.

18. An optical pulse measurement system as in claim 17 in which said detector means is a photodetector positioned to receive said reflected output signals, said photodetector means having a square-law amplitude response and a time response long relative to the duration of said output signals.

19. An optical pulse measurement system as in claim 15 in which said first pulse is linearly polarized, and in which said reference pulse is produced from said first pulse and is orthogonally polarized with respect thereto.

20. An optical pulse measurement system as in claim 15 in which said first pulse and said second pulse are of different optical frequencies.

21. An optical pulse measurement system as in claim 15 and including polarizing means for applying a first polarization to said first pulse, and a polarization orthogonal to said first pulse to said reference pulse.

22. An optical pulse measurement system as in claim 15 in which said plurality of spaced reflectors forming said optical cavity comprise first and second prisms.

23. An optical pulse measurement system as in claim 15 in which said birefringent crystal is calcite.

24. An optical pulse measurement system as in claim 15 in which said optical multiplier crystal is formed from the class of crystals in which ordinary-extraordinary optical beam interaction produces a sum frequency signal.

25. An optical pulse measurement system as in claim 16 in which said transmitting medium extends partially outside said optical cavity in the path of said first pulse, said first pulse being refracted by said transmitting medium to thereby inject said first pulse initially into said optical cavity.

26. A method for measuring an optical pulse comprising the steps of generating at least one optical pulse, injecting said optical pulse into an optical resonator in which said optical pulse is continuously recirculated, injecting a reference pulse coincident in time with said optical pulse into said resonator to circulate therein, producing an increasing relative time delay between said optical pulse and said reference pulse during each circulation about said resonator, interacting said optical pulse and said reference pulse in an optical multiplier during each circulation about said resonator to produce during each circulation an output pulse proportional to the product of the amplitudes of said pulses, transmitting each said output pulse out of said optical resonator, detecting each said output pulse with a photodetector which generates in response to said pulses a series of output pulses proportional to the intensity correlation function of said original optical pulse with said reference pulse, and plotting the said correlation function in response to the series of output pulses from said photodetector.

References Cited

Maier et al., "Intense Light Bursts in the Stimulated Roman Effect," Phys. Rev. Lett., 17 (26), Dec. 26, 1966, pp. 1275–7.

Armstrong, J., "Measurement of Picosecond Lazer Pulse Widths," App. Phys. Lett., 10 (1) Jan. 1, 1967, pp. 16–18.

Magdich, "Determination of the Shape of the Pulses Generated by a Gas Laser with Mutual Synchronization of Intermodal Beats," Optics and Spectroscopy, 22 (1), January 1967, pp. 83–4.

DONALD L. WIBERT, Primary Examiner

R. J. WEBSTER, Assistant Examiner

U.S. Cl. X.R.

356—225; 250—199; 235—181; 331—94.5